(12) United States Patent
Klein et al.

(10) Patent No.: US 7,132,166 B1
(45) Date of Patent: Nov. 7, 2006

(54) COMBUSTION, HVOF SPRAYING OF LIQUID CRYSTAL POLYMER COATING ON COMPOSITE, METALLIC AND PLASTICS

(75) Inventors: John Frederick Klein, Port Washington, NY (US); Jim Clark, deceased, late of Greenlawn, NY (US); by June Clarke, legal representative, Greenlawn, NY (US)

(73) Assignee: Northrop Grumman Corporation, Los Angeles, CA (US)

( * ) Notice: Subject to any disclaimer, the term of this patent is extended or adjusted under 35 U.S.C. 154(b) by 20 days.

(21) Appl. No.: 10/881,438

(22) Filed: Jun. 30, 2004

Related U.S. Application Data

(62) Division of application No. 10/314,682, filed on Dec. 9, 2002, now Pat. No. 6,793,976.

(51) Int. Cl.
*B32B 27/00* (2006.01)
*B32B 27/34* (2006.01)
*B32B 27/36* (2006.01)

(52) U.S. Cl. .............................. 428/411.1; 428/474.4; 428/480

(58) Field of Classification Search ............. 428/411.1, 428/474.4, 480
See application file for complete search history.

(56) References Cited

U.S. PATENT DOCUMENTS

| | | | |
|---|---|---|---|
| 4,007,298 A * | 2/1977 | Feehan et al. ............... | 427/195 |
| 4,037,074 A | 7/1977 | Montbrun et al. ..... | 219/121.47 |
| 4,262,034 A | 4/1981 | Andersen .................... | 427/450 |
| 5,211,990 A | 5/1993 | McKinney et al. .......... | 427/447 |
| 5,233,153 A | 8/1993 | Coats ..................... | 219/121.47 |
| 5,360,647 A | 11/1994 | Sumida ....................... | 428/216 |
| 5,681,624 A | 10/1997 | Moriya ......................... | 428/1.6 |
| 5,817,372 A | 10/1998 | Zheng ......................... | 427/456 |
| 5,844,192 A | 12/1998 | Wright et al. ............ | 219/76.16 |
| 5,885,668 A * | 3/1999 | Culbertson et al. ........ | 428/1.55 |
| 6,043,451 A | 3/2000 | Julien et al. ........... | 219/121.47 |
| 6,120,854 A | 9/2000 | Clarke et al. ................ | 427/447 |
| 2002/0110682 A1 * | 8/2002 | Brogan ....................... | 428/325 |

FOREIGN PATENT DOCUMENTS

WO    WO 00/15433    3/2000

* cited by examiner

Primary Examiner—Ramsey Zacharia
(74) Attorney, Agent, or Firm—Stetina, Brunda, Garred & Brucker

(57) ABSTRACT

An embodiment of the present invention provides a protective layer which includes an aggregate of long chain molecules wherein each long chain molecule is randomly oriented and consistently entangled to adjacent long chain molecules throughout the aggregate of long chain molecules. Additionally, the layer is essentially free from voids and essentially free from residual stresses. By way of example and not limitation, the long chain molecule may be a plastic or liquid crystal polymer. Additionally, a method for forming the protective layer is disclosed herein. The method includes the steps of disposing an aggregate of long chain molecules in a liquid state onto a substrate such that each long chain molecule is randomly oriented, maintaining the liquid state of the aggregate of long chain molecules such that each long chain molecule is consistently entangled to adjacent long chain molecules throughout the aggregate of long chain molecules, and solidifying the aggregate of long chain molecules from the liquid state to a solid state.

5 Claims, 2 Drawing Sheets

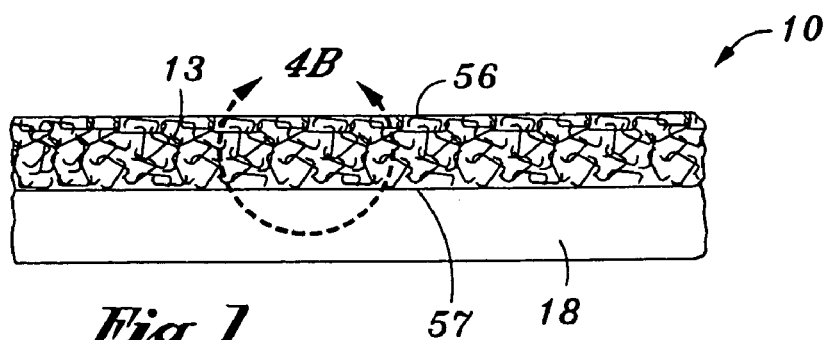
Fig. 1
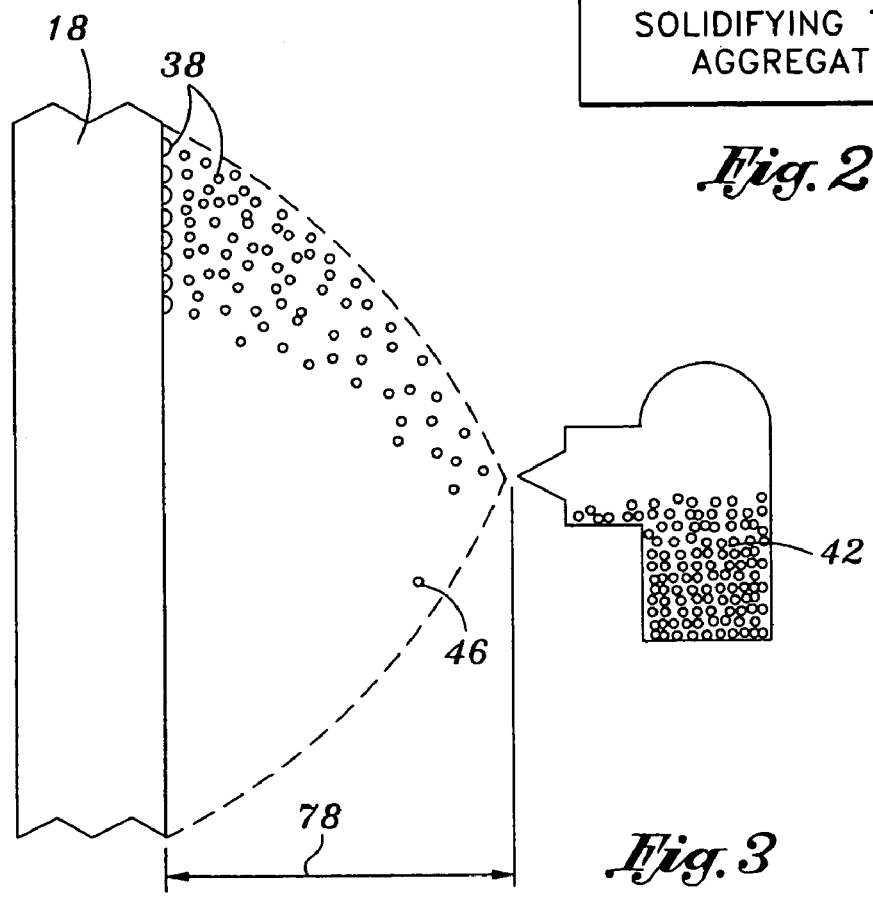
Fig. 2
Fig. 3

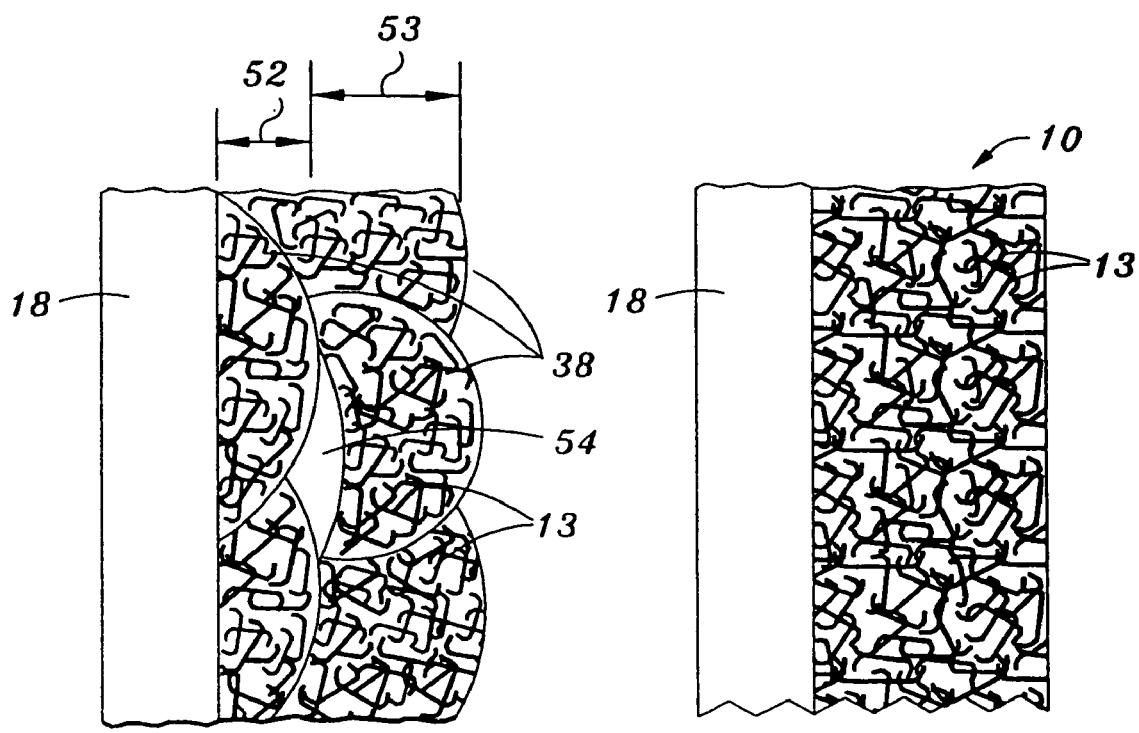
*Fig. 4A*
(PRIOR ART)
*Fig. 4B*
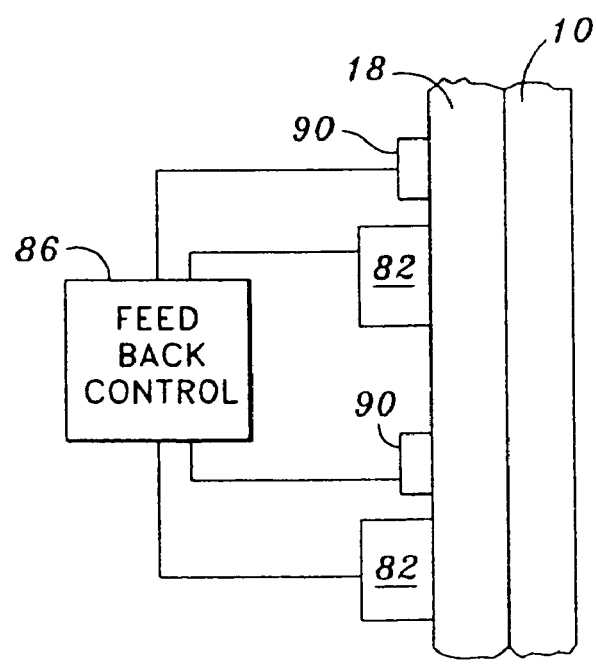
*Fig. 5*

COMBUSTION, HVOF SPRAYING OF LIQUID CRYSTAL POLYMER COATING ON COMPOSITE, METALLIC AND PLASTICS

CROSS-REFERENCE TO RELATED APPLICATIONS

This is a division of application Ser. No. 10/314,682, filed on Dec. 9, 2002 now U.S. Pat. No. 6,793,976.

STATEMENT RE: FEDERALLY SPONSORED RESEARCH/DEVELOPMENT

The U.S. Government has a paid-up license in this invention and the right in limited circumstances to require the patent owner to license others on reasonable terms as provided for by the terms of Agreement No. N00014-98-3-0014 awarded by the Office of Naval Research.

FIELD OF THE INVENTION

The present invention relates generally to protective coatings and methods of forming protective coatings on a substrate. In particular, the present invention is directed to a liquid crystal polymer formed on a substrate to protect the substrate from the environment.

BACKGROUND OF THE INVENTION

As is well known, metallic and composite structures mounted upon the exterior of ships, aircraft, and other objects subject to the environment can experience significant degradation and damage due to their exposure to erosion-corrosion attack. In this regard, such structures are constantly subjected to oxidation, moisture, erosion, fouling, salt spray, wear, ultraviolet radiation, impact, high/low temperatures, and chemicals, among other things, that can cause such structures to experience significant degradation and damage over time. As a consequence, such structural components must be constantly repaired or replaced to thus prevent the possibility that a given vessel or aircraft will be damaged permanently, if not destroyed.

In an attempt to prevent damage to a substrate caused by its exposure to the environment, a variety of coating agents and methods of applying the same to such components have been developed to improve the durability of the substrate and coating. To this end, liquid crystal polymer coatings (LCP coatings) have been utilized. In this regard, LCPs have been coated on substrates via spraying. However, merely spraying LCPs onto a substrate without preheating the substrate to maintain the liquid crystal polymer in a plastic state upon contact thereon will form a LCP coating with voids contained therein. Additionally, merely spraying LCPs onto a substrate without preheating the substrate to maintain the liquid crystal polymer in a plastic state upon contact thereon will reduce the adhesion between the substrate and the LCP coating. In relation to the voids, the same reduces the effectiveness of the coatings barrier properties. Additionally, the voids behave as starting points for cracks that may propagate due to foreign object impact from the environment. As such, voids in the layer of liquid crystal polymer reduce the life of the protective coating.

Another method of applying a liquid crystal polymer is to bond a film of the polymer onto the substrate. However, in general, the liquid crystal polymer film is not useful for bonding onto contoured surfaces because the film is not stretchable. Furthermore, film form of liquid crystal polymers have long chain molecules in orderly arrangement.

BRIEF SUMMARY OF THE INVENTION

In an embodiment of the present invention, a protective layer is provided for protecting a substrate from an environment. The protective layer comprises an aggregate of long chain molecules wherein each long chain molecule is randomly oriented and consistently entangled to adjacent long chain molecules throughout the aggregate of long chain molecules. The aggregate of long chain molecules is essentially free from voids. The aggregate of long chain molecules is essentially free from residual stresses. The long chain molecule is a liquid crystal polymer. The protective layer is disposed on the substrate.

In another embodiment of the present invention, a method of forming a protective layer on a substrate is provided to protect the substrate from an environment. The method comprises 1) disposing an aggregate of long chain molecules in a liquid state onto the substrate such that each long chain molecule is randomly oriented, 2) maintaining the liquid state of the aggregate of long chain molecules such that each long chain molecule is consistently entangled to adjacent long chain molecules throughout the aggregate of long chain molecules, and 3) solidifying the aggregate of long chain molecules from the liquid state to a solid state.

The method may further comprise a pre-heating step which injects heat into the aggregate of long chain molecules prior to the disposing step to facilitate consistent entanglement of each long chain molecule to adjacent long chain molecules throughout the aggregate of long chain molecules.

In relation to the disposing or the maintaining step, those steps may further include the step of injecting heat into the aggregate of long chain molecules.

During the injecting heat step, such step injects heat into the aggregate of long chain molecules at a plurality of sites which are independently controllable with respect to each other. The amount of heat to be injected at each site is in response to a sensed temperature of the aggregate of long chain molecules. Additionally or alternatively, the heat being injected into the aggregate of long chain molecules at the sites may be in response to a compared deviation between the sensed temperature and a stored temperature. The sensed temperature may be obtained with an optical pyrometer.

The heat may be injected into the aggregate of long chain molecules through an environmentally exposed side of the aggregate of tong chain molecules. By way of example and not limitation, the heat may be injected through conduction, convection, thermal radiation, or combinations thereof.

Additionally, in relation to the disposing step, such step may be accomplished by spraying droplets onto the substrate wherein each droplet is a portion of the aggregate of long chain molecules. The droplets have a diameter of about 20 microns to about 80 microns. Preferably, the diameter of the droplets are about 50 microns to about 60 microns. The spraying of the droplets may be accomplished with a mechanically controlled spray gun traversing the substrate at a selected spray distance and traverse rate. By way of example and not limitation, the spray gun may be a thermal spray plasma, combustion, or high velocity oxi fuel gun.

In relation to the maintaining step, such step is performed until the aggregate of long chain molecules are essentially free from residual stress.

BRIEF DESCRIPTION OF THE DRAWINGS

These as well as other features of the present invention will become more apparent upon reference to the drawings wherein:

FIG. 1 is a sectional view of a protective layer;

FIG. 2 is a flow diagram of a method of forming the protective layer of FIG. 1;

FIG. 3 is a diagram depicting droplets of liquid crystal polymer being applied to a substrate via spraying;

FIG. 4A is an enlarged sectional view of a protective layer showing a void wherein the droplets have not flowed together;

FIG. 4B is an enlarged sectional view of a protective layer without voids wherein the droplets have flowed together; and FIG. 5 is a block diagram depicting a temperature sensors and heat sources controlled by a feed back control.

DETAILED DESCRIPTION OF THE INVENTION

An example of the present invention for purpose of illustrating the preferred embodiments only, and not for purposes of limiting the same will be discussed. Additional modifications and improvements of the present invention may also be apparent to those of ordinary skill in the art. Thus, the particular combinations of parts described and illustrated herein are intended to represent only certain embodiments of the present invention, and are not intended to serve as limitations within the spirit and scope of the invention.

Referring to FIG. 1, an embodiment of the present invention provides a protective layer 10 made of a solidified aggregate of liquid crystal polymer (LCP) molecules 13 disposed on a substrate 18 to protect the substrate 18 from an environment. The detailed description of the present invention will use the LCP molecule 13 merely to describe the various embodiments of the present invention and not to limit its scope. As discussed below, any long chain molecule may be utilized with the present invention described herein.

The protective layer 10 protects the substrate 18 from oxidation, moisture, erosion, fouling, salt spray, wear, ultraviolet radiation, impact, high/low temperatures and chemicals. The protective layer 10 of the present invention is better able to protect the substrate 18 from the environment compared to other protective coatings for the following reasons which are only representative and not comprehensive of all the reasons.

First, the aggregate of LCP molecules 13 are tangled to each other. In particular, each LCP molecule 13 is tangled to an adjacent LCP molecule 13 consistently throughout the aggregate of LCP molecules 13. In this regard, the protective layer 10 is essentially free of voids compared to other LCP coatings. Additionally, the aggregate of LCP molecules 13 that make up the protective layer 10 have a random orientation. Furthermore, the protective layer 10 is essentially free from residual stresses. Second, the protective layer 10 of the present invention exhibits higher barrier properties compared to other coatings that are thicker. Additionally, the protective layer 10 of the present invention exhibits a more consistent thickness compared to other coatings. A discussion of the structure of the protective layer 10 will be discussed which will be followed by a discussion of a method of making the same.

In the following detailed description, a LCP molecule 13 will be used to describe the features of an embodiment of the present invention. However, the structure(s) and the method(s) disclosed herein may be applied to any long chain molecule. By way of example and not limitation, exemplary of long chain molecules are LCP molecules 13 and plastics.

In an embodiment of the present invention, a solidified aggregate of LCP molecules 13 is disposed on the substrate 18. The solidified aggregate of LCP molecules 13 may be directly bonded to the substrate 18. Alternatively, the solidified aggregate of LCP molecules 13 may be retained on the substrate 18 by encapsulating the substrate 18 with the solidified aggregate of LCP molecules 13. For example, if the solidified aggregate of LCP molecules 13 completely covers a spherical substrate 18 then the wrapping of the spherical substrate 18 with the aggregate of LCP molecules 13 would retain the aggregate of LCP molecules 13 on the spherical substrate 18 even if a cohesive bond between the spherical substrate 18 and the aggregate of LCP molecules 13 did not exist.

The aggregate of LCP molecules 13 which form the protective layer 10 is essentially free from voids 54 therein. An absence of voids 54 prevent cracks from forming within the protective layer 10 because a crack cannot develop without a starting point. As such, for cracks to occur in the absence of voids 54 within the protective layer 10, foreign objects from the environment impacting the protective layer 10 must overcome the elastic limit of the protective layer 10 and rupture the protective layer 10 thereby creating a starting point for a crack to form. An existence of voids 54 within the protective layer 10 could be the starting point of a crack which develops upon repeated impact by foreign objects thereby degrading and reducing the life of the protective layer 10. In this regard, the protective layer 10 being essentially free from voids 54, as shown in FIG. 4B, would have a longer life and provide better protection than a protective coating having voids 54, as shown in FIG. 4A, based on a view that the former coating requires the additional energy of starting a crack to degrade the protective layer 10. A guideline of whether the protective layer 10 is essentially free from voids will be discussed below.

The barrier property of the protective layer 10 is increased as the amount of voids 54 within the layer 14 is reduced. The barrier properties of the protective layer 10 may be measured either as an oxygen permeation value having units of measure of $cm^3$ mil/100 $in^2$-DAY-ATM or a water vapor transmission rate having the units of measure of g/mil/100 $in^2$-DAY. In particular, the barrier properties of the protective layer 10 achieved through the process described herein is less than about 0.1 $cm^3$ mil/100 $in^2$-DAY-ATM or less than about 0.1 g/mil/100 $in^2$-DAY.

The protective layer 10 is an aggregate of LCP molecules 13 or long chain molecules which have a random orientation, as shown in FIG. 1. This random orientation of LCP molecules 13 has the beneficial effect of increasing the barrier characteristics of the protective layer 10, namely its barrier property and physical strength to a level greater than coatings formed of LCP molecules 13 having an ordered orientation.

The LCP molecules 13 are tangled together. In particular, each LCP molecule 13 within the aggregate is tangled with other immediately adjacent LCP molecules 13. The entanglement between the LCP molecules 13 is consistent throughout the aggregate of LCP molecules 13. More particularly, each LCP molecule 13 is tangled to adjacent or neighboring LCP molecules 13 to substantially the same extent as the adjacent LCP molecule 13 is tangled to its adjacent LCP molecules 13, as shown in FIG. 4B.

Additionally, the protective layer 10 is essentially free from residual stresses. A guideline of whether the protective layer 10 is essentially free from residual stresses will be discussed below.

A method of forming the protective layer 10 will be discussed. In general, as shown in FIG. 2, the method comprises step 26 of disposing an aggregate of LCP molecules 13 in a liquid state onto the substrate 18 such that each LCP molecule 13 is randomly oriented, step 30 of maintaining the liquid state of the aggregate of LCP molecules 13 such that each LCP molecule 13 is consistently entangled to adjacent long chain molecules 13 throughout the aggregate of LCP molecules 13, then step 34 of solidifying the aggregate of LCP molecules 13 from the liquid state to a solid state.

Step 26, namely disposing the aggregate of LCP molecules 13 on the substrate 18, may be accomplished through various methods as long as each LCP molecule 13 is laid on the substrate 18 in a random orientation. By way of example and not limitation, the aggregate of LCP molecules 13 may be sprayed onto the substrate 18, as shown in FIG. 3, with a spray gun 50. In this regard, grains 42 having a solid state may be melted prior to injecting the grains 42 into a spray gun gas stream 46. The grains 42 being a portion of the aggregate of LCP molecules, and the aggregate of LCP molecules being LCP molecules sufficient to coat the substrate. Alternatively, the grains 42 may be melted by the heat of the spray gun gas stream 46. In the end, droplets 38 in the liquid state are propelled onto the substrate 18, as shown in FIG. 3.

In relation to accomplishing the disposing step 26 with a spray gun 50, the diameter of the droplets 33 sprayed therefrom is limited by the size of droplets 38 that the spray gun 50 is capable of spraying. Additionally, the size of the droplet 38 is dependent upon the amount of energy that the droplet 38 is able to absorb without vaporizing and/or degrading the chemical structure (i.e., protective characteristics) of the molecule 13. For example, a constant amount of heat is added to a cluster of grains 42 of LCP molecules 13. In other words, heat is not directed to a specific grain 42 but to the cluster as a whole. Hence, the smallest size grain 42 will receive an equivalent amount of heat as the largest size grain 42. As such, the amount of heat must be sufficient to melt the largest grain yet sufficient to allow the smallest grain 42 to absorbed the heat without vaporizing and/or degrading the chemical structure (i.e., protective characteristics) of the molecule. In general, the droplets 38 are about 20 microns to about 80 microns in diameter. The preferred diameter of the droplets 38 being about 50 microns to about 60 microns. In relation to the spray gun 50, by way of example and not limitation, the spray gun 50 may be a thermal spray plasma, combustion, or High Velocity Oxi Fuel gun.

When spraying melted droplets 38 onto a substrate 18, the LCP molecules 13 are propelled onto the substrate 18. Upon impact, the droplets 38 will solidify creating pancake shaped solidified droplets 38 on the substrate 18 defining a first layer 52. In general, the droplets 38 solidify upon impact when the substrate 18 is colder than the droplets 38. In this regard, the heat energy within each droplet 38 dissipates through the substrate 18 thereby solidifying the droplets 38. In other words, the substrate 18 behaves analogously to a heat sink. When the spray gun 50 passes over the same area a second time, a second layer 53 of droplets 38 are formed on the first layer 52 of droplets 38. In this regard, if the first layer 52 of droplets 38 solidify before the second layer 53 of droplets 38 are allowed to flow together with the first layer 52 of droplets 38, voids 54 are formed within the protective layer, as shown in FIG. 4A.

In FIG. 4A, each LCP molecule 13 is not entangled with its adjacent LCP molecule 13 consistently throughout the aggregate of LCP molecules 13 wherein the aggregate of LCP molecules 13 make up the complete protective layer 10. In particular, the LCP molecule 13 at the boundary of the droplet 38 will be entangled to other adjacent LCP molecules 13 within the same droplet 38 consistently throughout such droplet 38; however, such LCP molecule 13 will not be entangled to other adjacent LCP molecules 13 in the adjacent droplet 38. As such, each LCP molecule 13 within the aggregate of LCP molecules 13 is not consistently entangled to adjacent LCP molecules 13 throughout the aggregate of LCP molecules 13.

Step 30, maintaining the liquid state of the aggregate of LCP molecules 13, may be accomplished through various methods. Basically, energy must be introduced into the aggregate of LCP molecules 13 through conduction, convection, thermal radiation, or combinations thereof at a greater rate than the energy dissipating from the aggregate of LCP molecules 13. By way of example and not limitation, energy may be introduced into the aggregate of LCP molecules 13 by heating the substrate 18 with heaters, heater flames, radiant heating panels, heat from the spray gun gas, or combinations thereof.

Alternatively or additionally, heat may be introduced into the aggregate of LCP molecules 13 directly. When heat is introduced into the aggregate of LCP molecules 13 directly, preferably the heat is introduced through an environmentally exposed side 56 of the aggregate of LCP molecules 13. In this way, the aggregate of LCP molecules 13 at an opposed side, which is closest to the substrate 18, is allowed to solidify and the environmentally exposed side 56 of the protective layer 10 which is farthest from the substrate 18 is allowed to remain in the liquid state so as to flow with the additional melted droplets 38 being sprayed thereon.

The substrate 18 may be heated so that melted LCP droplets 38 do not solidify upon contact with the substrate 18 but is allowed to flow together to eliminate voids 54 within the protective layer 10. When LCP droplets 38 in the liquid state are sprayed onto the heated substrate 18, the heated substrate 18 maintains the droplets 38 in the liquid state for a period of time sufficient so that the droplets 38 can flow together and remove any voids 54 that may exist therein.

In contrast, as shown in FIG. 4A, if an unheated substrate 18 was sprayed with melted droplets 38, then the droplets 38 would collectively form a first layer 52 having individualized solidified droplets 38 formed thereon. Subsequently, when more droplets 38 are sprayed onto the substrate 18, these droplets 38 collectively form a second layer 53 which are applied to the first layer 52 after the first layer had solidified. As such, voids 54 would exist between the first and second layer based on a view that the droplets of the first and second layer were not allowed to flow together to eliminate the existence of voids 54 within the protective coating 10.

As a further refinement of the maintaining step 30, the injection of heat into the aggregate of LCP molecules 13 may be non-uniform throughout the aggregate of LCP molecules 13. In other words, varying amounts of heat may be injected into local areas of the aggregate of LCP molecules 13 when needed. This non-uniform injection of heat is most beneficial when the substrate 18 is not flat but curved because heat will dissipate from the aggregate of LCP molecules 13 unevenly. In this regard, the aggregate of LCP molecules 13 in the liquid state may solidify in certain areas while other portions may remain in the liquid state. As a result, when droplets 38 in the liquid state are deposited on the solidified portion, the sprayed on melted droplets 38 will not flow together with the solidified portion thereby creating voids 54 within the protective layer 10.

The injection of heat into the aggregate of LCP molecules 13 may be regulated as a function of its temperature, more specifically, the temperature of the aggregate on its environmentally exposed side 56. To obtain such temperature, the same is sensed at a plurality of sites and the temperature between sensors are calculated based on such sensed temperatures. The quantity and location of the sites are dependent upon required accuracy of the protective layer surface temperature throughout the protective layer 10. For example, if the temperature is too high then the LCP molecules 13 will have a tendency to vaporize and/or degrade the chemical structure (i.e., protective characteristics) of the molecule. If the temperature is too low then the LCP molecules 13 will have a tendency to solidify. The former contingency is not desirable because the aggregate of LCP molecules 13 may not be evenly, in relation to thickness, applied to the substrate 18. The latter contingency is not desirable because the droplets 38 will not flow together and voids 54 will remain within the protective layer 10. In this regard, a sufficient quantity of sites must exist to obtain a temperature gradient throughout the protective layer surface such that the proper amount of heat may be introduced into the coat such that the aggregate of LCP molecules 13 do not experience such temperatures. In this regard, the calculated temperature gradient should identify the maximum and minimum temperature throughout the aggregate of LCP molecules 13 so as to allow one to determine whether the unfavorable former or latter contingency exists.

The temperature of the aggregate of LCP molecules is measured and calculated. When the sensed or calculated temperature is below or approaching the solidification temperature of the droplets 38 then the heaters located in those areas are activated so as to inject heat into the substrate at that location. Conversely, when the sensed or calculated temperature is above or approaching the vaporization and/or degradation temperature of the droplets 38 then the heaters located in those areas are deactivated so as to dissipate the energy within the coating 10.

By way of example and not limitation, the substrate 18 or protective layer 10 temperature may be sensed directly or indirectly at a plurality of sites with a temperature sensor 90 such as a thermocouple, an optical pyrometer, optical sensors, thermal sensors, other temperature sensing devices, or combinations thereof, as shown in FIG. 5. The temperature of the substrate 18 is sensed to calculate a temperature of the protective layer 10 at the environmentally exposed side 56 of the coat 10.

The plurality of sites are located at strategic sites on the substrate surface sufficient in number so that a temperature gradient within the melted aggregate of LCP molecules 13 can be calculated to determine whether the droplets 38 have flowed together. The site location is dependent upon the contour of the substrate 18 based on a view that heat dissipation is a function of the substrate contour.

In response to the sensed temperatures, independently controlled heat sources 82 may be activated by a feedback control 86 to inject heat to the melted aggregate of LCP molecules 13 to further promote the flowing amongst the droplets 38 to eliminate voids 54 within the aggregate of LCP molecules. The independent heat sources 82 inject a non-uniform heat pattern into the aggregate of LCP molecules at a plurality of sites. The location and number of the plurality of sites are determined based on the allowable maximum and minimum temperature of the aggregate of LCP molecules 13. For example, the temperature of the aggregate of LCP molecules 13 must be controlled to a level where the same will not exceed its vaporization and/or degradation temperature and will not solidify before the droplets 38 are allowed to completely flow together.

The substrate 18 may be any material that is capable of maintaining a solid state while its temperature is raised to a level where droplets 38 in the liquid state sprayed thereon 18 are allowed to flow together. By way of example and not limitation, the substrate 18 may be a plastic, metal, or composite.

If the disposing step 26 is accomplished by spraying droplets 38 of LCP molecules 13 in the liquid state on a substrate 18, then the heat applied to the substrate 18 or melted protective layer 10 is maintained throughout spraying. In particular, a spraying step is accomplished by the steps of heating a directional moving gas 46 to a temperature sufficient to melt grains 42 of LCP molecules 13, injecting grains 42 of LCP molecules into the heated moving gas 46 forming melted droplets 38 of LCP molecules 13, then directing the melted LCP droplets 38 onto the substrate 18. Alternatively, the grain 42 may be pre-melted prior to entering the heated gas 46 and as such the temperature of the gas 46 may be reduced or set at ambient temperature so long as the droplets 38 are able to flow together upon contact with the substrate 38.

The spraying step allows the aggregate of LCP molecules 13 to be applied to contoured surfaces. The aggregate of LCP molecules 13 in its solid state is not flexible enough to allow a film of LCP molecules 13 to be evenly applied to a contoured surface (E.g., a sphere) based on a view that fold lines would be created thereby producing voids 54 within the protective layer 10. Additionally, the application of the LCP molecules 13 via spraying produces the random orientation of LCP molecules 13 that forms the protective layer 10. The random orientation of LCP molecules 13 increases the protective characteristics of the coat 10 compared to a coat 10 having an ordered orientation of LCP molecules 13.

The maintaining step 30 allows the droplets 38 to flow together to the greatest extent possible. In particular, the maintaining step 30 is sustained until the entanglement between the individual LCP molecules 13 in adjacent droplets 38 have flowed together. As discussed above, the droplets 38 are maintained at a temperature such that the droplets will not vaporize, degrade and may flow together. In other words, the maintaining step 30 is sustained until the protective layer 10 has reached a state where the voids have been minimized, and each LCP molecule 13 is entangled to an adjacent LCP molecule 13 consistently throughout the protective layer 10. In this regard, the aggregate of LCP molecules is considered to be essentially free from voids.

Additionally, the maintaining step 30 relieves the residual stresses that may be present within the protective layer 10 due to the disposing step 26 and/or solidifying step. In particular, compressive and tension stresses are created within the protective layer when the droplets 38 of LCP molecules 13 are propelled to the substrate. The aggregate of LCP molecules 10 is considered to be essentially free from residual stress when each LCP molecule 13 is entangled to an adjacent LCP molecule 13 consistently throughout the protective layer 10.

The final step is solidifying 34 the aggregate of LCP molecules 13 disposed on the substrate 18. The solidification step 34 may be performed through forced cooling or through ambient cooling. To ambiently cool the aggregate of LCP molecules 13 in the liquid state, merely turn all heat sources off. To force cool the melted coat, the substrate may be cooled with a heat sink or be water cooled. The cooling may be focused to areas so as to allow the aggregate of LCP molecules 13 to solidify evenly in relation to the depth and area of the protective layer 10.

In general, the resultant structure associated with subjecting a LCP molecule 13 to the process described above is as follows. First, each LCP molecule 13 will have a random orientation within the protective layer 10. In other words, the arrangement of molecules will have a non-crystalline structure. Second, each LCP molecule 13 will be tangled with adjacent LCP molecules 13 throughout the aggregate of LCP molecules. In this regard, the protective layer 10 will be essentially free from residual stresses and essentially free from voids.

The solidifying step 34 may be performed simultaneously with the maintaining step 30. These two steps 30 and 34 are performed simultaneously to allow the aggregate of LCP molecules 13 to solidify evenly in relation to the its depth or in relation to its surface area. For example, the environmentally exposed side 56 may be injected with heat while heat will be dissipated from the opposed side 57. The rate of injection and dissipation may be varied in local areas of the protective layer 10 as a function of the substrate contour and other factors. As such, the environmentally exposed side 56 will have more time to flow the LCP molecules 13 together such that the residual stresses and the voids within the protective layer 10 may be eliminated or reduced.

In relation to the above described method of forming a protective layer 10, the spray gun may be mechanically controlled as to its spray distance 78 from the substrate 18 and traverse rate in relation to the substrate 18. In this regard, the thickness of the protective layer 10 may be more uniform than that which is achievable with a spray gun controlled by a human hand.

As stated above, the protective layer 10 is formed on the substrate 18 to protect the substrate 18 from the environment. Alternatively, the protective layer 10 may be formed on a tool which subsequently transfers the protective layer 10 to the substrate 18. By way of example and not limitation, the protective layer 10 is formed on a tool having a surface. The surface upon which the protective layer 10 is formed mates with a surface on the substrate 18 to be coated. The surface of the substrate 18 to be coated and the surface of the tool upon which the protective layer 10 is formed are then mated together. The protective layer 10 is then transferred from the tool to the substrate 18 by heat curing. In this regard, protective layer 10 is not formed directly onto the substrate 18; rather, the protective layer 10 is formed onto the substrate 18 indirectly through the intermediary tool.

What is claimed is:

1. A structure protected from an environment, the structure comprising:
   a substrate; and
   a protective layer of liquid crystal polymers directly bonded to the substrate wherein each liquid crystal polymer of the protective layer is randomly oriented and consistently entangled to adjacent liquid crystal polymers throughout the protective layer.

2. The structure of claim 1 wherein the protective layer of liquid crystal polymers is essentially free from voids.

3. The structure of claim 1 wherein the protective layer of liquid crystal polymers is essentially free from residual stresses.

4. The structure of claim 1 wherein the protective layer has a consistent thickness throughout.

5. The structure of claim 1 wherein the protective layer has an oxygen permeation value of less than $0.1 \text{ cm}^3/100 \text{ in}^2$ DAY-ATM.

* * * * *